(12) United States Patent
Kim et al.

(10) Patent No.: US 11,127,531 B2
(45) Date of Patent: Sep. 21, 2021

(54) MULTILAYER CERAMIC ELECTRONIC COMPONENT HAVING DUMMY ELECTRODES IN COVER LAYER OF BODY THEREOF

(71) Applicant: SAMSUNG ELECTRO-MECHANICS CO., LTD., Suwon-si (KR)

(72) Inventors: Tae Hyeok Kim, Suwon-si (KR); Jea Yeol Choi, Suwon-si (KR); Sang Soo Park, Suwon-si (KR); Hwi Dae Kim, Suwon-si (KR); Young Jun Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/554,052

(22) Filed: Aug. 28, 2019

(65) Prior Publication Data

US 2020/0143990 A1 May 7, 2020

(30) Foreign Application Priority Data

Nov. 7, 2018 (KR) .................. 10-2018-0135728

(51) Int. Cl.
*H01G 4/012* (2006.01)
*H01G 4/30* (2006.01)
(Continued)

(52) U.S. Cl.
CPC ............ *H01G 4/12* (2013.01); *H01G 4/012* (2013.01); *H01G 4/232* (2013.01); *H01G 4/30* (2013.01)

(58) Field of Classification Search
CPC ........ H01G 4/012; H01G 4/085; H01G 4/232; H01G 4/12; H01G 4/30
See application file for complete search history.

(56) References Cited

U.S. PATENT DOCUMENTS 4,097,911 A * 6/1978 Dorrian ............... H01G 4/0085
29/25.42
6,576,523 B1 * 6/2003 Honda ................. H01G 4/005
438/381
(Continued)

FOREIGN PATENT DOCUMENTS

JP 58212120 A * 12/1983
JP 2000124057 A * 4/2000
(Continued)

OTHER PUBLICATIONS

Korean Office Action dated Oct. 28, 2019 issued in Korean Patent Application No. 10-2018-0135728 (with English translation).

*Primary Examiner* — David M Sinclair
(74) *Attorney, Agent, or Firm* — Morgan, Lewis & Bockius LLP (57) ABSTRACT

A multilayer ceramic electronic component includes: a ceramic body including an active layer, in which first and second internal electrodes are disposed with a dielectric layer interposed therebetween, the N number of each of the first and second internal electrodes being stacked to be alternately exposed from first and second external surfaces; and first and second external electrodes disposed on the first and second external surfaces of the ceramic body and connected to the first and second internal electrodes, respectively. The ceramic body further includes a cover layer disposed above or below the active layer. The cover layer includes a plurality of first and second dummy electrodes. A number (A>N) of the first and second dummy electrodes are stacked to be alternately exposed from the first and second external surfaces.

18 Claims, 4 Drawing Sheets

(51) Int. Cl.
*H01G 4/12* (2006.01)
*H01G 4/232* (2006.01)

(56) References Cited

U.S. PATENT DOCUMENTS

| | | | |
|---|---|---|---|
| 7,307,829 B1 * | 12/2007 | Devoe | H01G 2/065 |
| | | | 361/303 |
| 2007/0025054 A1 | 2/2007 | Tonogai et al. | |
| 2013/0342081 A1 * | 12/2013 | Kuroda | H01G 4/30 |
| | | | 310/366 |
| 2014/0131082 A1 | 5/2014 | Ahn et al. | |
| 2014/0240898 A1 * | 8/2014 | Kim | H01G 4/30 |
| | | | 361/303 |
| 2014/0290998 A1 | 10/2014 | Ahn et al. | |
| 2015/0364258 A1 | 12/2015 | Hattori et al. | |
| 2016/0133384 A1 * | 5/2016 | Park | H01G 4/012 |
| | | | 361/301.4 |
| 2016/0163454 A1 * | 6/2016 | Iwama | H01G 4/224 |
| | | | 361/301.4 |
| 2016/0163455 A1 | 6/2016 | Iwama et al. | |
| 2017/0229244 A1 | 8/2017 | Nakazawa et al. | |

FOREIGN PATENT DOCUMENTS

| | | | | |
|---|---|---|---|---|
| JP | 2007-042743 A | | 2/2007 | |
| JP | 2015115518 A | * | 6/2015 | ............... B21D 1/05 |
| JP | 2016-111247 A | | 6/2016 | |
| JP | 2017-143129 A | | 8/2017 | |
| KR | 10-1412940 B1 | | 6/2014 | |
| KR | 10-1452049 B1 | | 10/2014 | |
| KR | 10-2015-0142592 A | | 12/2015 | |

* cited by examiner

MULTILAYER CERAMIC ELECTRONIC COMPONENT HAVING DUMMY ELECTRODES IN COVER LAYER OF BODY THEREOF

CROSS-REFERENCE TO RELATED APPLICATION(S)

This application claims benefit of priority to Korean Patent Application No. 10-2018-0135728 filed on Nov. 7, 2018 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic electronic component is small and easily mounted, while high capacity is secured. Due to the advantages described above, such a multilayer ceramic electronic component is widely used as an IT component in computers, PDAs, and mobile phones. In addition, due to high reliability and high strength characteristics, the multilayer ceramic electronic component is also widely used as an electric component.

Recently, a thickness of a multilayer ceramic electronic component has been reduced due to the thinning of IT products, and further improved circuit performance (for example, equivalent series inductance, and/or equivalent series resistance) has been required.

Accordingly, the strength (for example, flexural strength, tensile strength, fixing strength, and the like) of the multilayer ceramic electronic component becomes more important, and a problem of delamination, which may occur in a multilayer ceramic electronic component, is also growing.

However, in general, there may be trade-off between strength and/or delamination of the multilayer ceramic electronic component with respect to a circuit performance.

SUMMARY

An aspect of the present disclosure is to provide a multilayer ceramic electronic component capable of improving an overall average of strength, delamination, and/or circuit performance.

According to an aspect of the present disclosure, a multilayer ceramic electronic component includes: a ceramic body including a dielectric layer and an active layer, in which first and second internal electrodes are disposed with the dielectric layer interposed therebetween, N number (where N is a natural number) of each of the first and second internal electrodes being stacked to be alternately exposed from first and second external surfaces; and first and second external electrodes disposed on the first and second external surfaces of the ceramic body and connected to the first and second internal electrodes, respectively. The ceramic body further includes a cover layer disposed above or below the active layer. The cover layer includes a plurality of first and second dummy electrodes. A number (where A is a natural number greater than N) of the first and second dummy electrodes are stacked to be alternately exposed to the first and second external surfaces.

According to an aspect of the present disclosure, a multilayer ceramic electronic component includes: a ceramic body including dielectric layers, and first and second internal electrodes stacked in a stacking direction of the ceramic body and exposed from first and second surfaces of the ceramic body, respectively; a first external electrode disposed on the first surface of the ceramic body and connected to the first internal electrodes; and a second external electrode disposed on the second surface of the ceramic body and connected to the second internal electrodes. N number of the first internal electrodes and N number of the second internal electrodes are alternately stacked in a first region in the stacking direction of the ceramic body, where N is a natural number. A number of the first internal electrodes and A number of the second internal electrodes are alternately stacked in a second region in the stacking direction of the ceramic body, where A is a natural number greater than N. A distance from the first region to an exterior surface of the ceramic body in the stacking direction is greater than a distance from the second region to the exterior surface of the ceramic body in the stacking direction.

According to an aspect of the present disclosure, a multilayer ceramic electronic component includes: a ceramic body including dielectric layers, and first and second internal electrodes stacked in a stacking direction of the ceramic body and exposed from first and second surfaces of the ceramic body, respectively; a first external electrode disposed on the first surface of the ceramic body and connected to the first internal electrodes; and a second external electrode disposed on the second surface of the ceramic body and connected to the second internal electrodes. N number of the first internal electrodes and N number of the second internal electrodes are alternately stacked in a region in the stacking direction of the ceramic body, where N is a natural number. A number of consecutively stacked internal electrodes among the first internal electrodes and B number of consecutive stacked internal electrodes among the second internal electrodes are respectively disposed on and below the region in the stacking direction, where each of A and B is a natural number greater than N. The consecutively stacked internal electrodes are internal electrodes separated from each other by only the dielectric layers disposed therebetween and connected to one of the first and second external electrodes.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 1:
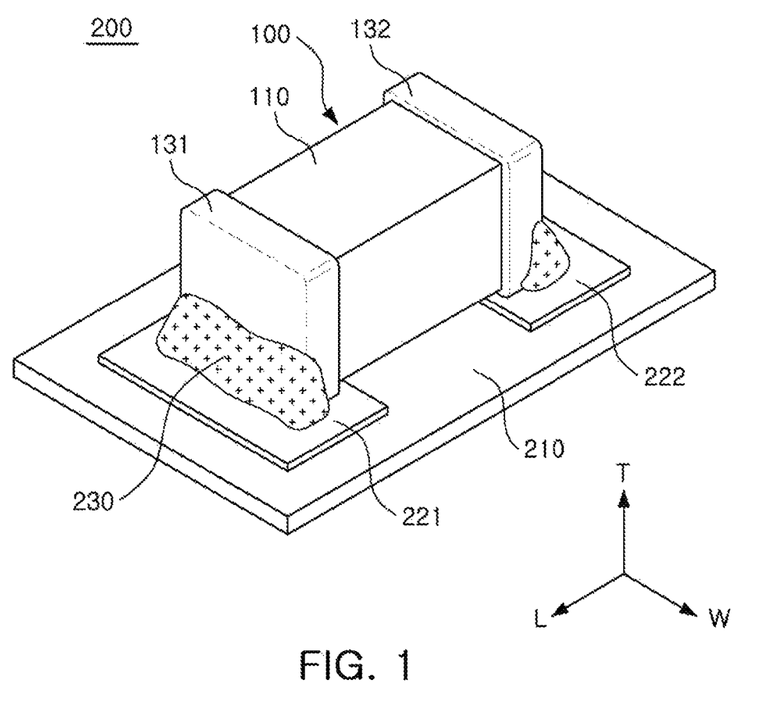
FIG. 1 is a perspective view of a mounted multilayer ceramic electronic component according to an embodiment.

FIG. 1 is a perspective view of a mounted multilayer ceramic electronic component according to an embodiment.

Referring to FIG. 1, a multilayer ceramic electronic component 100 according to an embodiment includes a ceramic body 110, as well as a first external electrode 131 and a second external electrode 132, and may be mounted on a mounting board 200 including a substrate 210 and a first electrode pad 221 and a second electrode pad 222 disposed on the substrate 210.

The ceramic body 110 may be formed in a hexahedron having both sides in a longitudinal direction L, both sides in a width direction W, and both sides in a thickness direction T. The ceramic body 110 is formed by stacking a plurality of dielectric layers 111 in the thickness direction T and then sintering the dielectric layers 111. Here, the form of the ceramic body 110, the dimensions thereof, and the stacking number of the dielectric layers 111 (one or more) are not limited to those illustrated in an embodiment.

The dielectric layers 111, disposed in the ceramic body 110, may be in a sintered state, and adjacent dielectric layers 111 may be integrated with each other so that boundaries therebetween are not readily apparent without using a scanning electron microscope (SEM).

For example, the ceramic body 110 may have eight corners with a rounded hexahedral shape. Accordingly, durability and reliability of the ceramic body 110 can be improved, and structural reliability of the first external electrode 131 and the second external electrode 132 at the corner may be improved.

The dielectric layer may have a thickness which can be changed according to the capacity design of the multilayer ceramic electronic component 100, and may include ceramic powder having a high dielectric constant, for example, barium titanate ($BaTiO_3$)-based or strontium titanate ($SrTiO_3$)-based powder, but the present disclosure is not limited thereto. Moreover, various ceramic additives, organic solvents, plasticizers, binders, dispersants, and the like may be added to the ceramic powder according to the purpose of the present disclosure.

An average particle diameter of the ceramic powder, used for formation of the dielectric layer 111, is not particularly limited, and may be adjusted for achieving the purpose of the present disclosure, but may be adjusted to, for example, 400 nm or less. Accordingly, the multilayer ceramic electronic component 100 according to an embodiment may be used as a component requiring miniaturization and high capacity such as IT components.

For example, the dielectric layer 111 may be formed by applying and drying slurry including powder such as barium titanate ($BaTiO_3$), or the like, on a carrier film to prepare a plurality of ceramic sheets. The ceramic sheet may be formed by mixing a ceramic powder, a binder, and a solvent to prepare slurry, and forming the slurry into a sheet having a thickness of several μm, using a doctor blade method, but the present disclosure is not limited thereto.

The first external electrode 131 and the second external electrode 132 may be disposed on a first external surface and a second external surface (for example: one side and the other side in the longitudinal direction L) of the ceramic body 110 to be connected to the first and second internal electrodes, and may be configured to electrically connect the first and second internal electrodes 121 and 122 to the first electrode pad 221 and the second electrode pad 222 on the substrate 210, respectively.

For example, the first external electrode 131 and the second external electrode 132 may include one among copper (Cu), palladium (Pd), platinum (Pt), gold (Au), silver (Ag) or lead (Pb), or alloys thereof.

For example, the first external electrode 131 and the second external electrode 132 may include a first electrode layer and a second electrode layer, including Cu or Ni, as well as a first plated layer and a second plated layer, disposed on the first electrode layer and the second electrode layer and including Ni or Sn.

The first electrode layer and the second electrode layer may be formed using a method for dipping in a paste containing a metal element, or a method for printing a conductive paste including a conductive metal on at least one side of the ceramic body 110 in the thickness direction T, and may be formed using a sheet transfer or pad transfer method.

The first plated layer and the second plated layer may be formed using sputtering or electrolytic plating such as electric deposition, but are not limited thereto.

The first external electrode 131 and the second external electrode 132 may be electrically connected to the first electrode pad 221 and the second electrode pad 222 through first and second solders 230. For example, the first and second solders 230 may be more tightly coupled to the first external electrode 131 and the second external electrode 132 according to a reflow process.

Figure 2:
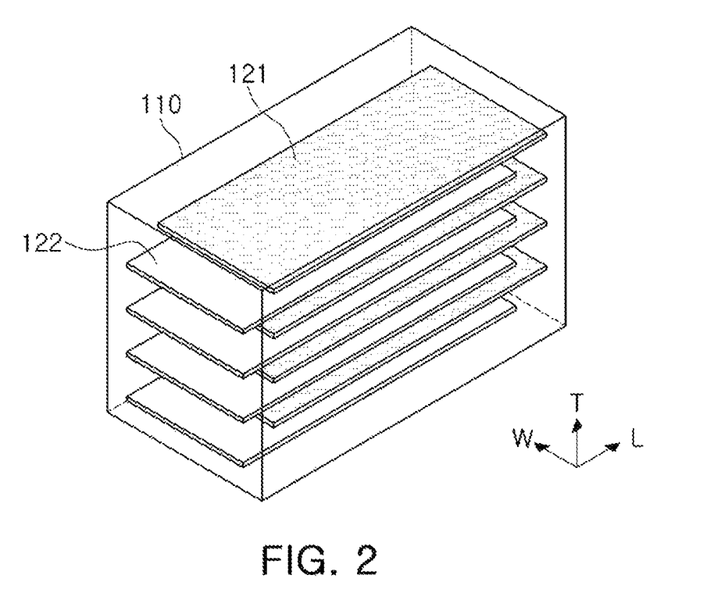
FIG. 2 is a perspective view illustrating a form of an internal electrode of a multilayer ceramic electronic component according to an embodiment.

FIG. 2 is a perspective view illustrating a form of an internal electrode of a multilayer ceramic electronic component according to an embodiment.

Referring to FIG. 2, a ceramic body 110 includes a first internal electrode 121 and a second internal electrode 122, and may include a dielectric layer disposed between the first internal electrode 121 and the second internal electrode 122.

The first internal electrode 121 and the second internal electrode 122 are stacked to be alternately exposed to a first external surface and a second external surface (for example: one side and the other side in a longitudinal direction) with a dielectric layer interposed therebetween so as to have different polarities.

The first internal electrode 121 and the second internal electrode 122 may be formed in a stacking direction of dielectric layers by printing a conductive paste including a conductive metal to be alternately exposed to one side surface and the other side surface of the ceramic body 110 in a longitudinal direction L, and may be electrically isolated from each other by the dielectric layer interposed therebetween.

That is, the first internal electrode 121 and the second internal electrode 122 may be electrically connected to the first external electrode 131 and the second external electrode 132, formed on both side surfaces of the ceramic body 110 in the longitudinal direction L, through portions alternately exposed to both side surfaces of the ceramic body 110 in the longitudinal direction L.

For example, the first internal electrode 121 and the second internal electrode 122 may be formed of a conductive paste for an internal electrode including a conductive metal powder having an average particle size of 0.1 μm to 0.2 μm and having 40 to 50 wt %, but are not limited thereto.

A conductive paste for an internal electrode is applied to the ceramic sheet using a printing method to form an internal electrode pattern. A method of printing the conductive paste such as screen printing or gravure printing may be used, but the present disclosure is not limited thereto. The ceramic sheet on which the internal electrode pattern is printed are provided as 200 to 300 ceramic sheets, and the 200 to 300 ceramic sheets are stacked, pressed, and sintered to manufacture the ceramic body 110.

Thus, a voltage is applied to the first and second external electrodes, charges are accumulated between the first internal electrode 121 and the second internal electrode 122, opposing each other. In this case, the capacitance of the multilayer ceramic electronic component 100 is proportional to an area of an overlapping region of the first internal electrode 121 and the second internal electrode 122.

That is, when the area of an overlapping region of the first internal electrode 121 and the second internal electrode 122 are maximized, the capacitance may be also maximized even in a capacitor having the same size.

A thickness of each of the first internal electrode 121 and the second internal electrode 122 may be determined depending on usage, for example, 0.25 μm or less. Moreover, the number of layers of the first internal electrode 121 and the second internal electrode 122 may be 400 or more. Accordingly, the multilayer ceramic electronic component 100 may be used as a component requiring miniaturization and high capacity such as IT (Information Technology) components.

A thickness of a dielectric layer corresponds to an interval between the first internal electrode 121 and the second internal electrode 122. Thus, as the thickness of the dielectric layer is reduced, the capacitance of the multilayer ceramic electronic component 100 may be increased.

A conductive metal included in a conductive paste forming the first internal electrode 121 and the second internal electrode 122 may be one among nickel (Ni), copper (Cu), palladium (Pd), silver (Ag), lead (Pb), or platinum (Pt), or alloys thereof, but the present disclosure is not limited thereto.

As an interval between the first internal electrode 121 and the second internal electrode 122 is longer, the withstand voltage characteristics of the ceramic body 110 may be improved.

If high withstand voltage characteristics are required in the multilayer ceramic electronic component 100 such as an electric component, the multilayer ceramic electronic component 100 may be designed to allow an average thickness of the dielectric layer 111 to be more than twice an average thickness of the first internal electrode 121 and the second internal electrode 122. Accordingly, the multilayer ceramic electronic component 100 may have high withstand voltage characteristics to be used as an electricity component.

Moreover, with respect to the durability of the ceramic body 110 (for example: bending strength), if a width of the ceramic body 110 exceeds 0.5 times a thickness thereof, high reliability may be provided.

Figure 3:
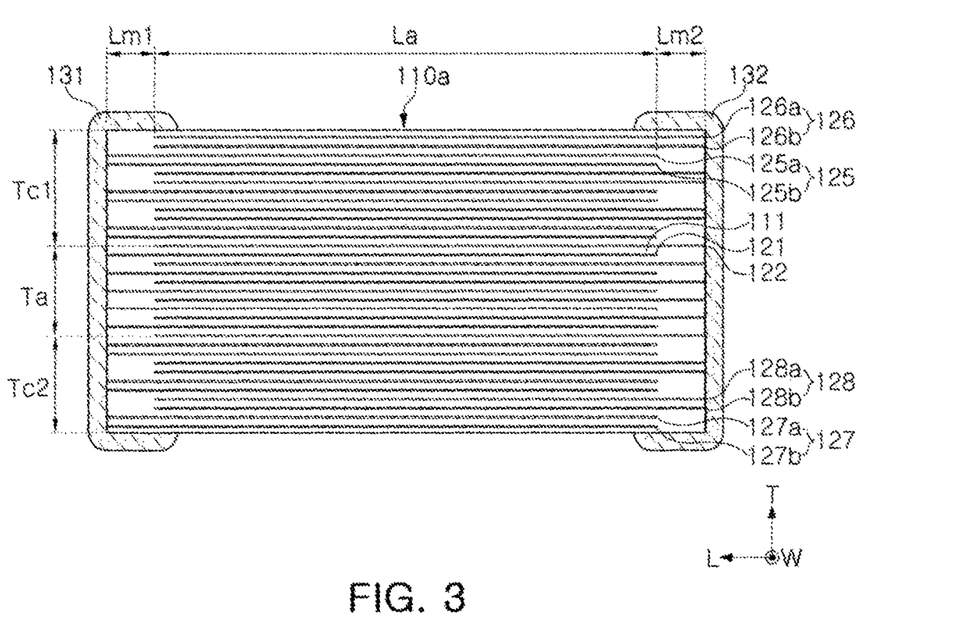
FIG. 3 is a side view illustrating a multilayer ceramic electronic component and a dummy electrode according to an embodiment.

FIG. 3 is a side view illustrating a multilayer ceramic electronic component and a dummy electrode according to an embodiment.

Referring to FIG. 3, a ceramic body 110a, included in a multilayer ceramic electronic component according to an embodiment, includes a first internal electrode 121 and a second internal electrode 122, a plurality of first dummy electrodes 125, a plurality of second dummy electrodes 126, a plurality of third dummy electrodes 127, and a plurality of fourth dummy electrodes 128. Using "dummy" to describe the electrodes inside the ceramic body is for convenience of explanation. The dummy electrodes contribute capacitance, similar to the first and second internal electrodes 121 and 122, although a degree of contribution to capacitance by the dummy electrodes per unit thickness of the ceramic body 110a is less than a degree of contribution to capacitance by the first and second internal electrodes 121 and 122 per unit thickness of the ceramic body. In this regard, the dummy electrodes are internal electrodes that contribute capacitance, in one embodiment.

The plurality of first, second, third, and fourth dummy electrodes 125, 126, 127, and 128 may be implemented using the same material, the same shape, the same dimension, and the same process as those of the first internal electrode 121 and the second internal electrode 122, but are not limited thereto.

The first internal electrode 121 and the second internal electrode 122 are disposed in an active layer having a thickness of Ta, and overlap each other in a thickness direction T by a length of La.

A portion of the first internal electrode 121, not overlapping the second internal electrode 122 in the thickness direction T, may be disposed in a first margin area having a length of Lm1. That is, the first internal electrode 121 may have a length of (La+Lm1).

A portion of the second internal electrode 122, not overlapping the first internal electrode 121 in the thickness direction T, may be disposed in a second margin area having a length of Lm2. That is, the second internal electrode 122 may have a length of (La+Lm2).

The n-number (where N is a natural number) of the first internal electrode 121 and the second internal electrode 122 are alternately exposed to first and second external surfaces. As N is smaller, the first internal electrode 121 and the second internal electrode 122 may have a larger capacitance. Thus, N may be 1, but is not limited thereto.

A cover layer is disposed above or below the active layer, and may include first and second cover layers.

The plurality of first dummy electrodes 125 and the plurality of second dummy electrodes 126 are disposed in the first cover layer having a thickness of Tc1.

The plurality of first dummy electrodes 125 and the plurality of second dummy electrodes 126 are disposed above the active layer, and A number (where A is a natural number greater than N) of the first dummy electrode 125 and the second dummy electrode 126 are stacked to be alternately exposed to first and second external surfaces, respectively.

That is, the plurality of first dummy electrodes 125 may include a 1-1-th dummy electrode 125a and a 1-2-th dummy electrode 125b, disposed without the second dummy electrode 126 interposed therebetween, while the plurality of second dummy electrodes 126 may include a 2-1-th dummy electrode 126a and a 2-2-th dummy electrode 126b, disposed without the first dummy electrode 125 interposed therebetween. That is, the first cover layer may include two or more first dummy electrodes 125 consecutively disposed without other internal electrodes or dummy electrodes disposed therebetween, and the two or more first dummy electrodes 125 may be exposed to only one of the first and second external surfaces opposing each other. The first cover layer may also include two or more second dummy electrodes 126 consecutively disposed without other internal electrodes or dummy electrodes disposed therebetween, and the two or more second dummy electrode 126 may be exposed to only the other of the first and second external surfaces opposing each other.

When A is 3 or more, the plurality of first dummy electrodes 125 may include 1-1-th to 1-A-th dummy electrodes, and the plurality of second dummy electrodes 126 may include 2-1-th to 2-A-th dummy electrodes. The second dummy electrode 126 is not located between the 1-1-th dummy electrode and the 1-A-th dummy electrode, while the first dummy electrode 125 is not located between the 2-1-th dummy electrode and the 2-A-th dummy electrode.

The plurality of third dummy electrodes 127 and the plurality of fourth dummy electrodes 128 are disposed in the second cover layer having a thickness of Tc2.

The plurality of third dummy electrodes 127 and the plurality of fourth dummy electrodes 128 are disposed below the active layer, and B number (where B is a natural number greater than N) of the third dummy electrode 127 and the fourth dummy electrode 128 are stacked to be alternately exposed to the first and second external surfaces, respectively. That is, the second cover layer may include two or more third dummy electrodes 127 consecutively disposed without other internal electrodes or dummy electrodes disposed therebetween, and the two or more third dummy electrodes 127 may be exposed to only one of the first and second external surfaces opposing each other. The second cover layer may also include two or more fourth dummy electrodes 128 consecutively disposed without other internal electrodes or dummy electrodes disposed therebetween, and the two or more fourth dummy electrode 128 may be exposed to only the other of the first and second external surfaces opposing each other.

That is, the plurality of third dummy electrodes 127 may include a 3-1-th dummy electrode 127a and a 3-2-th dummy electrode 127b, disposed without the fourth dummy electrode 128 interposed therebetween, while the plurality of fourth dummy electrodes 128 may include a 4-1-th dummy electrode 128a and a 4-2-th dummy electrode 128b, disposed without the third dummy electrode 127 interposed therebetween.

When B is 3 or more, the plurality of third dummy electrodes 127 may include 3-1-th to 3-B-th dummy electrodes, and the plurality of fourth dummy electrodes 128 may include 4-1-th to 4-B-th dummy electrodes. The fourth dummy electrode 128 is not located between the 3-1-th dummy electrode and the 3-B-th dummy electrode, while the third dummy electrode 127 is not located between the 4-1-th dummy electrode and the 4-B-th dummy electrode.

The plurality of first, second, third, and fourth dummy electrodes 125, 126, 127, and 128 do not contribute much to capacitance (for example, less than half) compared to the first internal electrode 121 and the second internal electrode 122, but may improve strength of the ceramic body 110a, and may suppress delamination of the first internal electrode 121 and the second internal electrode 122 and the dielectric layer 111.

The plurality of first, second, third, and fourth dummy electrodes 125, 126, 127, and 128 are disposed in first and second cover layers, thereby increasing a volume of a conductive metal with respect to a total volume of the first and second cover layers. Since the conductive metal has greater strength as compared with a ceramic component according to the related art, as a volume of a conductive metal with respect to a total volume of the first and second cover layers is increased, stronger strength may be provided. Moreover, through strong strength, delamination of the first internal electrode 121 and the second internal electrode 122 and the dielectric layer 111 may be suppressed.

In addition, the first and second cover layers have a more similar structure to a structure of the active layer depending on the arrangement of the plurality of first, second, third, and fourth dummy electrodes 125, 126, 127, and 128, so delamination may be prevented from occurring depending on heterogeneous characteristics between the active layer and the first and second cover layers.

Overlapping of the plurality of first, second, third, and fourth dummy electrodes 125, 126, 127, and 128 in a thickness direction with respect to an adjacent dummy electrode may improve the action-reaction efficiency between the plurality of first, second, third, and fourth dummy electrodes 125, 126, 127, and 128, and the impact dispersion efficiency of the plurality of first, second, third, and fourth dummy electrodes 125, 126, 127, and 128 may be improved. Thus, as an overall overlap ratio of the plurality of first, second, third, and fourth dummy electrodes 125, 126, 127, and 128 is increased, the strength of the first and second cover layers may be stronger.

That is, as A is greater, the plurality of first and second dummy electrodes 125 and 126 may have greater strength. Moreover, as B is greater, the plurality of third and fourth dummy electrodes 127 and 128 may have greater strength.

Ideally, the first cover layer may have the strongest strength when one of the plurality of first and second dummy electrodes 125 and 126 is only included, while the second cover layer may have the strongest strength when one of the plurality of third and fourth dummy electrodes 127 and 128 is only included.

However, when the first cover layer only include one of the plurality of first and second dummy electrodes 125 and 126, all dummy electrodes, included in the first cover layer, may have a current path with respect to only one of the first external electrode 131 and the second external electrode 132. Moreover, when the second cover layer only include one of the plurality of third and fourth dummy electrodes 127 and 128, all dummy electrodes, included in the second cover layer, may have a current path with respect only to one of the first external electrode 131 and the second external electrode 132. In this case, the first and second cover layers may allow a circuit performance of a ceramic body to be deteriorated. For example, the ceramic body may have relatively high equivalent series inductance (ESL) according to current induction toward a dummy electrode, and has a relatively narrow current path to have relatively high equivalent series resistance (ESR).

A plurality of dummy electrodes, included in a multilayer ceramic electronic component according to an embodiment, have an overall high overlap ratio, thereby improving strength while reducing equivalent series inductance (ESL) and equivalent series resistance (ESR) through current path dispersion in a cover layer.

If each of A and B is 2, the first and second cover layers efficiently distribute a current path to secure a circuit performance and to have structural similarity (that is, each of A and B is close to N) to the active layer. Thus, while delamination is effectively suppressed, a high overlap ratio of dummy electrodes is maintained to secure strength. However, A and B are limited to 2.

That is, in a multilayer ceramic electronic component according to an embodiment, A and B are increased in order to have strong strength, while A and B are decreased in order to improve a circuit performance (for example: ESL, ESR).

For example, a thickness of each of the first internal electrode 121 and the second internal electrode 122 and a thickness of each of the plurality of first, second, third, and fourth dummy electrodes 125, 126, 127, and 128 may be 0.25 μm or less.

Moreover, a thickness (Ta+Tc1+Tc2) of the ceramic body 110a may exceed 0 time and is equal to or less than ½ times a width of the ceramic body 110a. That is, a multilayer ceramic electronic component according to an embodiment may be thinned.

In general, when a thickness of an electrode inside a ceramic body is reduced, the stacking number per unit thickness of a ceramic body and capacitance may be improved, and a size of the ceramic body may be smaller. However, strength of the ceramic body 110a may be deteriorated, and the frequency of the delamination may be increased.

In the multilayer ceramic electronic component according to an embodiment, a thickness of each of the first internal electrode 121 and the second internal electrode 122 as well as the plurality of first, second, third, and fourth dummy electrodes 125, 126, 127, and 128 is provided to be thin, for example, 0.25 μm or less, while the overall strength, delamination, and circuit performance may be improved. Thus, the overall capacitance, size, strength, delamination, and circuit performance may be improved, and the multilayer ceramic electronic component may be thinned more easily.

In addition, a ratio of a thickness (Tc1+Tc2) of a cover layer with respect to a thickness (Ta+Tc1+Tc2) of the ceramic body 110a may be 25% or more and 40% or less. In other words, a ratio of a thickness (Ta) of an active layer with respect to a thickness (Ta+Tc1+Tc2) of the ceramic body 110a may be 60% or more and 75% or less. That is, the thickness (Tc1+Tc2) of the cover layer may be about ½ times the thickness (Ta) of the active layer. Here, when each of A and B is 2 and N is 1, each of A and B is 2 times N, so a current path of the ceramic body 110a may be dispersed most harmoniously. Thus, a circuit performance of the ceramic body 110a may be optimized.

On the other hand, when a length of each of the plurality of first, second, third, and fourth dummy electrodes 125, 126, 127, and 128 is equal to a length of the first internal electrode 121 and the second internal electrode 122, the plurality of first, second, third, and fourth dummy electrodes 125, 126, 127, and 128 disperse the impact more efficiently, thereby having strong strength. In addition, as variables are reduced in a manufacturing process of the ceramic body 110a, the production efficiency/yield of the ceramic body 110a can be improved.

Figure 4:
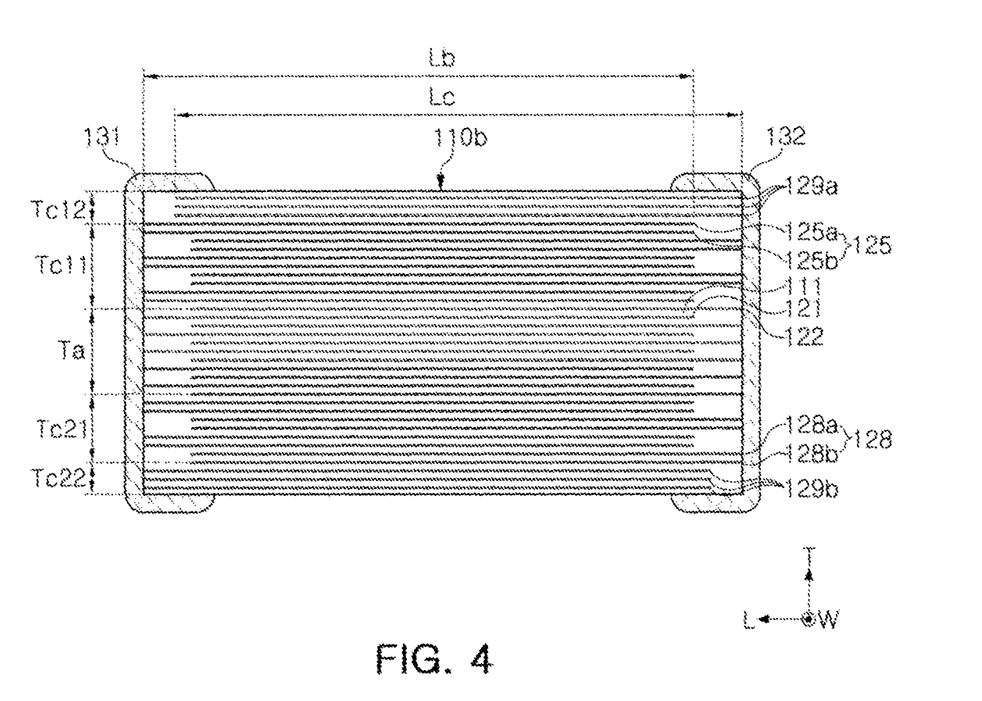
FIG. 4 is a side view of a multilayer ceramic electronic component and a cover dummy electrode according to an embodiment.

FIG. 4 is a side view of a multilayer ceramic electronic component and a cover dummy electrode according to an embodiment.

Referring to FIG. 4, a ceramic body 110b included in a multilayer ceramic electronic component according to an embodiment may further include a plurality of fifth dummy electrodes 129a and a plurality of sixth dummy electrodes 129b.

The first cover layer may include a 1-1-th cover layer having a thickness of Tc11, and a 1-2-th cover layer having a thickness of Tc12, while the second cover layer may include a 2-1-th cover layer having a thickness of Tc21, and a 2-2-th cover layer having a thickness of Tc22.

The plurality of first dummy electrodes 125 and the plurality of second dummy electrodes may be disposed on the 1-1-th cover layer, while the plurality of third dummy electrodes and the plurality of fourth dummy electrodes 128 may be disposed on the 2-1-th cover layer.

The plurality of fifth dummy electrodes 129a may be disposed on the 1-2-th cover layer, closer to an upper surface of the ceramic body 110b, rather than the 1-1-th cover layer. The plurality of sixth dummy electrodes 129b may be disposed on the 2-2-th cover layer, closer to a lower surface of the ceramic body 110b, rather than the 2-1-th cover layer. Thus, the plurality of fifth and sixth dummy electrodes 129a and 129b may be integrally defined as a plurality of cover dummy electrodes. For example, three or more fifth dummy electrodes 129a may be consecutively disposed without other internal electrodes or dummy electrodes disposed therebetween, and the three or more fifth dummy electrodes 129a may be exposed to only one of the first and second external surfaces opposing each other. Three or more sixth dummy electrodes 129b may be consecutively disposed without other internal electrodes or dummy electrodes disposed therebetween, and the three sixth dummy electrode 129b may be exposed to only the other of the first and second external surfaces opposing each other, The plurality of fifth dummy electrodes 129a are disposed above the plurality of first and second dummy electrodes 125 and 126, and C number (where C is a natural number greater than A) of fifth dummy electrodes 129a may be exposed to a first or second external surface. The plurality of sixth dummy electrodes 129b are disposed below the plurality of third and fourth dummy electrodes 128 and 129, and D number (where D is a natural number greater than A) of sixth dummy electrodes may be exposed to a first or second external surface. That is, E number (where E is a natural number greater than A or B) of a plurality of cover dummy electrodes may be exposed.

Since C is greater than A, the plurality of fifth dummy electrodes 129a may have stronger strength than that of the plurality of first and second dummy electrodes 125 and 126. Since D is greater than B, the plurality of sixth dummy electrodes 129b may have stronger strength than that of the plurality of third and fourth dummy electrodes 125 and 126.

The plurality of fifth dummy electrodes 129a having stronger strength than that of the plurality of first and second dummy 125 and 126 electrodes are disposed closer to an upper surface of the ceramic body 110b, while the plurality of sixth dummy electrodes 129b having stronger strength than that of the plurality of third and fourth dummy electrodes 127 and 128 are disposed closer to a lower surface of the ceramic body 110b. Thus, the rigidity of the ceramic body 110b may be further concentrated on an upper surface and/or a lower surface.

In general, external impacts (for example: bending, tension, and the like) are more concentrated on the upper and/or the lower surface of the ceramic body 110b. Thus, the ceramic body 110b, in which the rigidity is more concentrated on the upper surface and/or the lower surface, may more efficiently cope with an external impact, and thus may have further improved strength.

For example, a length Lc of each of the plurality of fifth and sixth dummy electrodes 129a and 129b may be greater than a length Lb of each of the plurality of first, second, third, and fourth dummy electrodes 125, 126, 127, and 128. Accordingly, the rigidity of the ceramic body 110b may be more concentrated on the upper surface and/or the lower surface, so that the ceramic body 110b may have further improved strength. The prevent disclosure, however, is not limited thereto. For example, although not shown, the length Lc of each of the plurality of fifth and sixth dummy electrodes 129a and 129b may be the same as the length Lb of each of the plurality of first, second, third, and fourth dummy electrodes 125, 126, 127, and 128.

Figure 5:
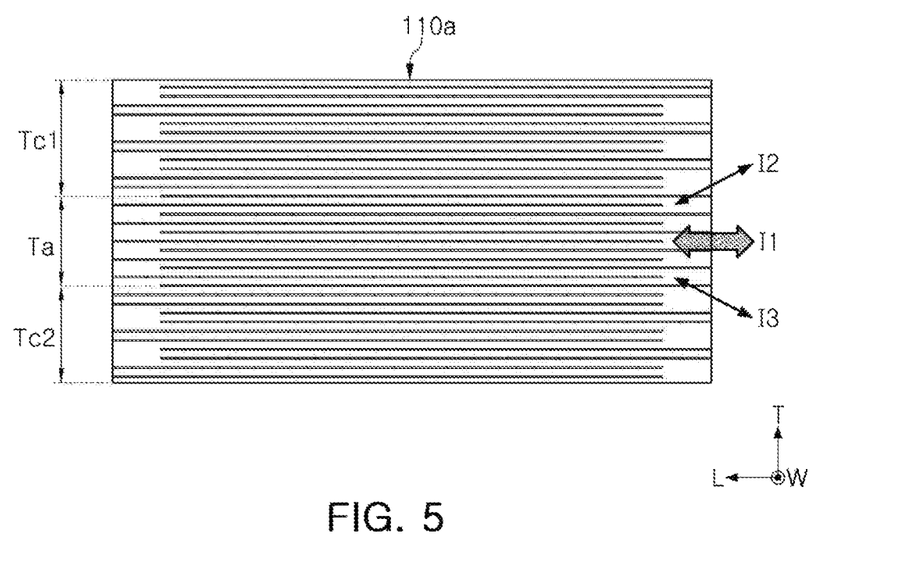
FIG. 5 is a side view provided for describing equivalent series resistance (ESR) of a multilayer ceramic electronic component according to an embodiment.

FIG. 5 is a side view provided for describing equivalent series resistance (ESR) of a multilayer ceramic electronic component according to an embodiment.

Referring to FIG. 5, a main current I1 of a ceramic body 110a may flow through an active layer having a thickness of Ta. The first cover layer having a thickness of Tc1 may provide a path of a first sub-current I2 according to connection to first and second external electrodes of first and second dummy electrodes, while the second cover layer having a thickness of Tc2 may provide a path of a second sub-current I3 according to connection to first and second external electrodes of third and fourth dummy electrodes.

If each of the first and second cover layers only provides a current path to one of the first and second external electrodes, an area of a current path of the first external surface (for example: a left edge) may correspond to the product of a (Ta+Tc1) and a width of a dummy electrode, and an area of a current path of the second external surface (for example: a right edge) may correspond to the product of (Ta+Tc2) and a width of the dummy electrode.

However, in a multilayer ceramic electronic component according to an embodiment, an area of a current path of each of the first external surface and the second external surface may correspond to the product of (Ta+Tc1+Tc2) and a width of the dummy electrode, so it may be wider as much as an area corresponding to the product of Tc1 and the width of the dummy electrode.

In general, since a resistance value is inversely proportional to an area of a current path, a multilayer ceramic electronic component according to an embodiment may reduce the equivalent series resistance (ESR) by increasing an area of a current path.

In addition, if each of the first and second cover layers only provides a current path to one of the first and second external electrodes, the current distribution in the first and second cover layers may be closer to the center of the ceramic body 110a relatively. The current distribution imbalance in the first and second cover layers, described above, may increase the equivalent series resistance (ESR).

However, in a multilayer ceramic electronic component according to an embodiment, current distribution in the first cover layer may be distributed further upwardly, while current distribution in the second cover layer may be distributed further downwardly. Accordingly, the multilayer ceramic electronic component according to an embodiment may improve the current distribution balance in the first and second cover layers to lower the equivalent series resistance (ESR).

In addition, when the current distribution in the first and second cover layers is further distributed toward the upper surface and the lower surface, parasitic inductance induced by the interaction in terms of a magnetic field between the currents of the first and second cover layers and the current of the active layer may be suppressed. Thus, a multilayer ceramic electronic component according to an embodiment may lower equivalent series inductance (ESL).

Figure 6A:
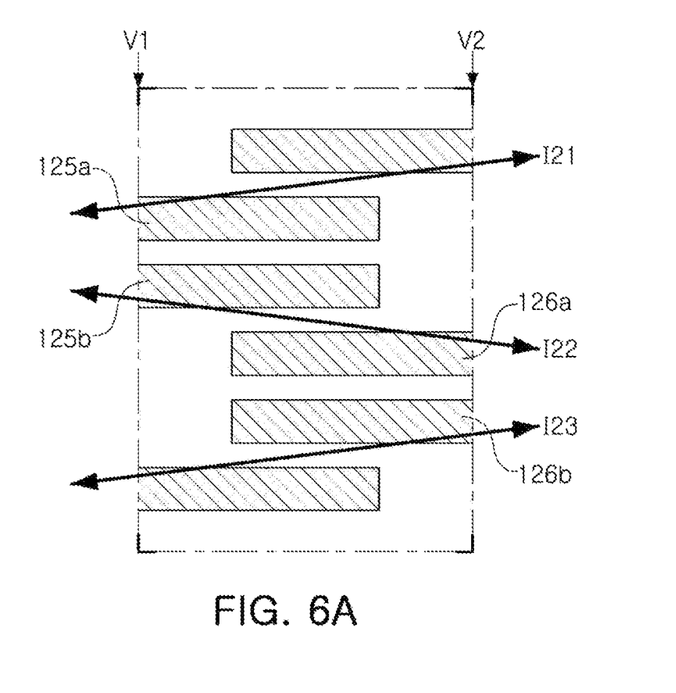
FIGS. 6A and 6B are side views provided for describing equivalent series inductance (ESL) of a multilayer ceramic electronic component according to an embodiment.
Figure 6B:
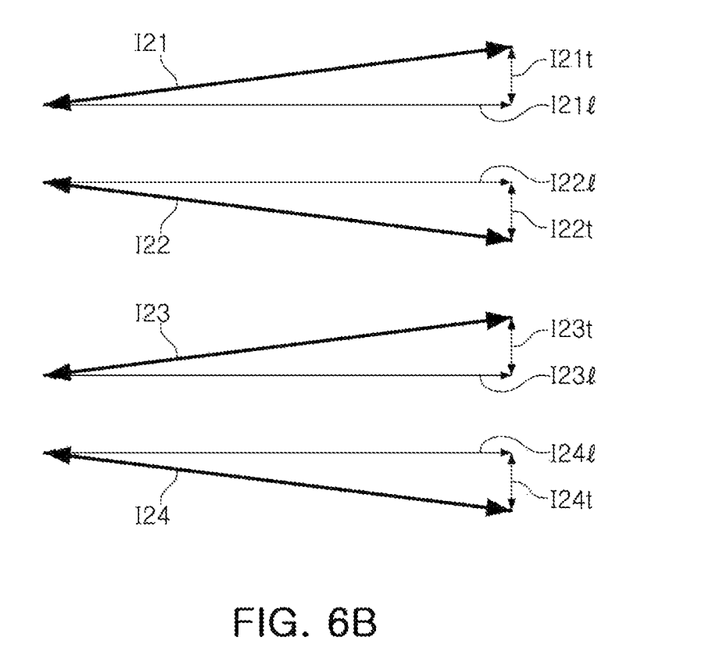

FIGS. 6A and 6B are side views provided for describing equivalent series inductance (ESL) of a multilayer ceramic electronic component according to an embodiment.

Referring to FIG. 6A, a 1-1-th dummy electrode 125a may form a 2-1-th current path I21 with a second dummy electrode in an upper side, a 1-2-th dummy electrode 125b may form a 2-2-th current path I22 with a 2-1-th dummy electrode 126a, and a 2-2-th dummy electrode 125b may form a 2-3-th current path I23 with a first dummy electrode in a lower side.

Assuming that a first voltage V1 is greater than a second voltage V2, a current, flowing in each of the 2-1-th, 2-2-th, and 2-3-th current paths I21, I22, and I23, may flow from a first external surface (for example: a left edge) to a second external surface (for example: a right edge).

Referring to FIG. 6B, a 2-1-th current path I21 may be composed of a 2-1-th longitudinal direction current path I211 and a 2-1-th thickness direction current path I21t, a 2-2-th current path I22 may be composed of a 2-2-th longitudinal direction current path I221 and a 2-2-th thickness direction current path I22t, a 2-3-th current path I23 may be composed of a 2-3-th longitudinal direction current path I231 and a 2-3-th thickness direction current path I23t, and a 2-4-th current path I24 may be composed of a 2-4-th longitudinal direction current path I241 and a 2-4-th thickness direction current path I24t.

Since the 2-1-th thickness direction current path I21t and the 2-2-th thickness direction current path I22t are in opposite directions, a magnetic field due to a current of the 2-1-th thickness direction current path I21t and a magnetic field due to a current of the 2-2-th thickness direction current path I22t may be canceled by each other.

Since the 2-3-th thickness direction current path I23t and the 2-4-th thickness direction current path I24t are in opposite directions, a magnetic field due to a current of the 2-3-th thickness direction current path I23t and a magnetic field due to a current of the 2-4-th thickness direction current path I24t may be canceled by each other.

Thus, a plurality of first and second dummy electrodes may have relatively low inductance, and may lower the equivalent series inductance (ESL).

As set forth above, according to an embodiment in the present disclosure, a multilayer ceramic electronic component may improve the overall average of strength, delamination, and/or circuit performance.

While exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
    a ceramic body including an active layer, in which first and second internal electrodes are disposed with a dielectric layer interposed therebetween, N number of each of the first and second internal electrodes being stacked to be alternately exposed from first and second external surfaces, where N is a natural number; and
    first and second external electrodes disposed on the first and second external surfaces of the ceramic body and connected to the first and second internal electrodes, respectively,
    wherein the ceramic body further includes a first cover layer and a second cover layer respectively disposed above and below the active layer,
    the first cover layer includes a plurality of first and second dummy electrodes, and a plurality of fifth dummy electrodes disposed above the plurality of first and second dummy electrodes, and
    A number of each of the plurality of first and second dummy electrodes are stacked to be alternately exposed from the first and second external surfaces, where A is a natural number greater than N,
    C number of the plurality of fifth dummy electrodes are exposed from one of the first external surface or the second external surface, where C is a natural number greater than A,
    the second cover layer includes a plurality of third and fourth dummy electrodes, and a plurality of sixth dummy electrodes disposed below the plurality of third and fourth dummy electrodes,
    B number of each of the plurality of third and fourth dummy electrodes are stacked to be alternately exposed from the first and second external surfaces, where B is a natural number greater than N,
    D number of the plurality of sixth dummy electrodes are exposed from another of the first external electrode or the second external surface, where D is a natural number greater than A, and
    the total number of the plurality of first and second dummy electrodes that overlap with each other in a stacking direction of the first and second internal electrodes is different from the total number of the plurality of third and fourth dummy electrodes that overlap with each other in the stacking direction of the first and second internal electrodes.

2. The multilayer ceramic electronic component of claim 1, wherein a thickness of each of the first and second internal electrodes exceeds 0 μm and is equal to or less than 0.25 μm, and
    a thickness of each of the first, second, third, and fourth dummy electrodes exceeds 0 μm and is equal to or less than 0.25 μm.

3. The multilayer ceramic electronic component of claim 1, wherein a length of each of the plurality of first, second, third, and fourth dummy electrodes is the same as a length of each of the first and second internal electrodes.

4. The multilayer ceramic electronic component of claim 1, wherein a length of each of the plurality of fifth and sixth dummy electrodes is longer than a length of each of the plurality of first, second, third, and fourth dummy electrodes.

5. The multilayer ceramic electronic component of claim 1, wherein a length of each of the plurality of fifth and sixth dummy electrodes is the same as a length of each of the plurality of first, second, third, and fourth dummy electrodes.

6. The multilayer ceramic electronic component of claim 1, wherein a thickness of the ceramic body exceeds 0 time and is equal to or less than ½ times a width of the ceramic body.

7. The multilayer ceramic electronic component of claim 1, wherein a ratio of a thickness of the active layer to a thickness of the ceramic body is equal to or greater than 60% and equal to or less than 75%.

8. The multilayer ceramic electronic component of claim 1, wherein a thickness of one of the first and second internal electrodes exceeds 0 μm and is equal to or less than 0.25 μm, and
    a thickness of one of the first, second, third, and fourth dummy electrodes exceeds 0 μm and is equal to or less than 0.25 μm.

9. A multilayer ceramic electronic component, comprising:
    a ceramic body including dielectric layers, and first and second internal electrodes stacked in a stacking direction of the ceramic body and exposed from first and second surfaces of the ceramic body, respectively, the first and second surfaces opposing each other in a length direction of the ceramic body;

a first external electrode disposed on the first surface of the ceramic body and connected to the first internal electrodes; and a second external electrode disposed on the second surface of the ceramic body and connected to the second internal electrodes, wherein N number of the first internal electrodes and N number of the second internal electrodes are alternately stacked in a first region in the stacking direction of the ceramic body, where N is a natural number, C number of the second internal electrodes stacked in a second region above the first region, where C is a natural number greater than N, D number of the first internal electrodes stacked in a third region below the first region, where D is a natural number greater than N, in the length direction, a length of one of the first internal electrodes and the second internal electrodes in the first region is the same as a length of another of the first internal electrodes and the second internal electrodes in the first region, the one of the first internal electrodes and the second internal electrodes in the first region and the another of the first internal electrodes and the second internal electrodes in the first region being immediately adjacent to each other, and in the length direction, a length of one of the first internal electrodes in the third region and the second internal electrodes in the second region is greater than the length of the one of the first internal electrodes and the second internal electrodes in the first region.

10. The multilayer ceramic electronic component of claim 9, wherein a thickness of each of the first and second internal electrodes exceeds 0 µm and is equal to or less than 0.25 µm.

11. The multilayer ceramic electronic component of claim 9, wherein a ratio of a thickness of the first region to a thickness of the ceramic body is equal to or greater than 60% and equal to or less than 75%.

12. The multilayer ceramic electronic component of claim 9, wherein a thickness of the one of the first internal electrodes and the second internal electrodes in the first region exceeds 0 µm and is equal to or less than 0.25 µm.

13. A multilayer ceramic electronic component, comprising:

a ceramic body including an active layer, in which first and second internal electrodes are disposed with a dielectric layer interposed therebetween, N number of each of the first and second internal electrodes being stacked to be alternately exposed from first and second external surfaces of the ceramic body, where N is a natural number, the first and second external surfaces opposing each other in a length direction of the ceramic body; and first and second external electrodes disposed on the first and second external surfaces of the ceramic body and connected to the first and second internal electrodes, respectively, wherein the ceramic body further includes a first cover layer and a second cover layer respectively disposed above and below the active layer, the first cover layer includes a plurality of first and second dummy electrodes, and a plurality of fifth dummy electrodes disposed above the plurality of first and second dummy electrodes, and A number of each of the plurality of first and second dummy electrodes are stacked to be alternately exposed from the first and second external surfaces, where A is a natural number greater than N, C number of the plurality of fifth dummy electrodes are exposed from one of the first external surface or the second external surface, where C is a natural number greater than A, the second cover layer includes a plurality of third and fourth dummy electrodes, and a plurality of sixth dummy electrodes disposed below the plurality of third and fourth dummy electrodes, B number of each of the plurality of third and fourth dummy electrodes are stacked to be alternately exposed from the first and second external surfaces, where B is a natural number greater than N, D number of the plurality of sixth dummy electrodes are exposed from another of the first external electrode or the second external surface, where D is a natural number greater than A, in the length direction, a length of one of the plurality of first, second, third, and fourth dummy electrodes is the same as a length of one of the first and second internal electrodes, and in the length direction, a length of one of the plurality of fifth and sixth dummy electrodes is greater than a length of the one of the plurality of first, second, third, and fourth dummy electrodes.

14. The multilayer ceramic electronic component of claim 13, wherein each of A and B is 2.

15. The multilayer ceramic electronic component of claim 13, wherein a thickness of each of the first and second internal electrodes exceeds 0 µm and is equal to or less than 0.25 µm, and a thickness of each of the first, second, third, and fourth dummy electrodes exceeds 0 µm and is equal to or less than 0.25 µm.

16. The multilayer ceramic electronic component of claim 13, wherein a thickness of the ceramic body exceeds 0 time and is equal to or less than ½ times a width of the ceramic body.

17. The multilayer ceramic electronic component of claim 13, wherein a ratio of a thickness of the active layer to a thickness of the ceramic body is equal to or greater than 60% and equal to or less than 75%.

18. The multilayer ceramic electronic component of claim 13, wherein a thickness of the one of the first and second internal electrodes exceeds 0 µm and is equal to or less than 0.25 µm, and a thickness of the one of the first, second, third, and fourth dummy electrodes exceeds 0 µm and is equal to or less than 0.25 µm.

* * * * *